Oct. 23, 1956
A. G. McKENNA
2,768,344
VOLTAGE REGULATING SYSTEM
Filed Oct. 8, 1952
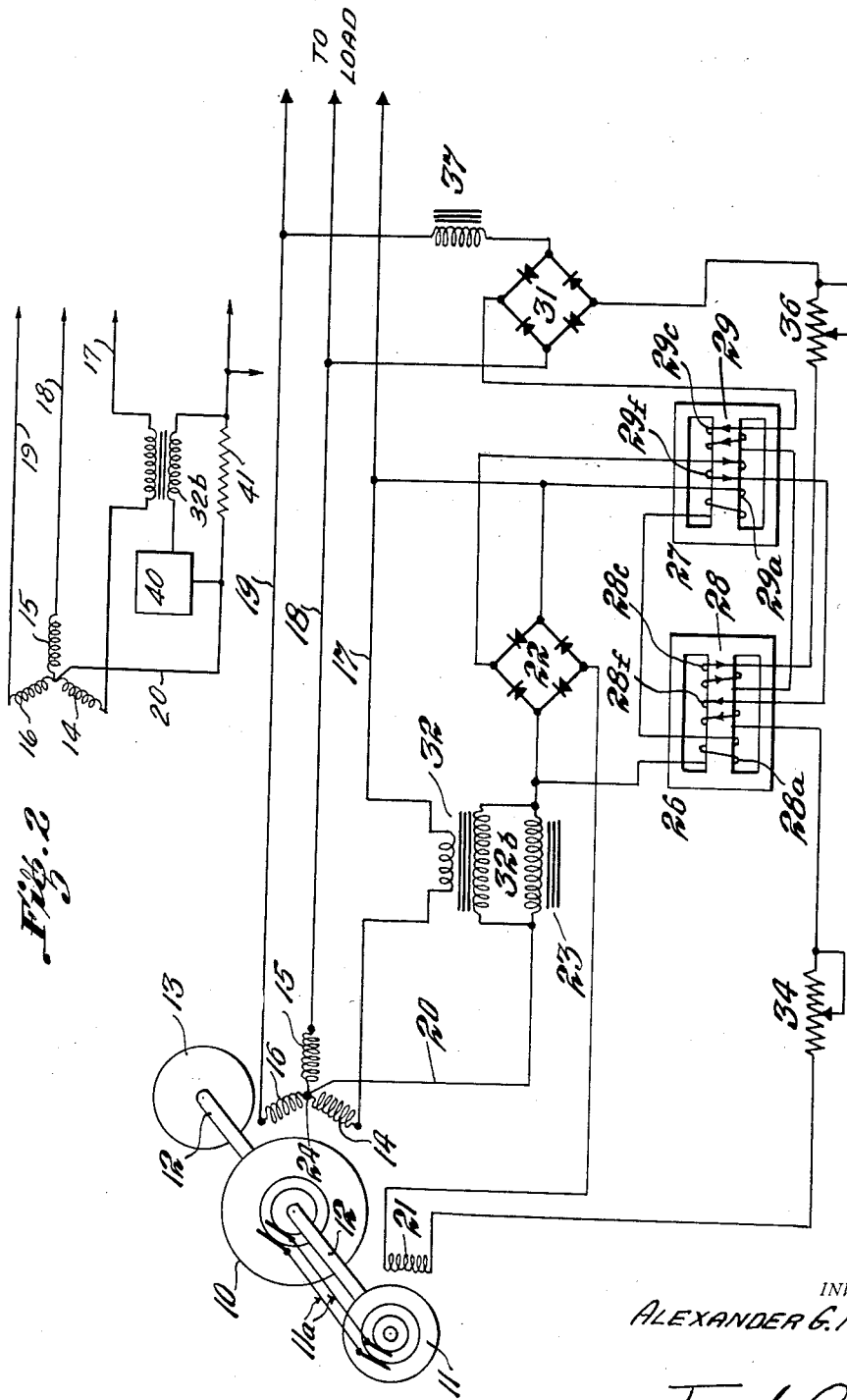
INVENTOR.
ALEXANDER G. McKENNA
BY Frank A. Bower
ATTORNEY United States Patent Office 2,768,344
Patented Oct. 23, 1956

2,768,344

VOLTAGE REGULATING SYSTEM

Alexander G. McKenna, Roslyn Heights, N. Y., assignor to Ward Leonard Electric Company, a corporation of New York Application October 8, 1952, Serial No. 313,753

11 Claims. (Cl. 322—25)

This invention relates to voltage regulating systems and is directed particularly to compensated voltage regulating systems. This invention is particularly adapted to the regulation of an alternating current generator having an exciter for supplying generator field current.

The main object of the invention is to provide a voltage regulating system that will accurately regulate the output voltage of a generator over a range of power factors. Another object of the invention is to provide a voltage regulating system utilizing apparatuses that are inexpensive to manufacture and made from readily available materials. Another object of the invention is to provide a voltage regulating system that is readily adapted to different types of voltage generators. Another object is to provide a generator voltage control that has a minimum amount of drift. Another object of the invention is to provide an independent voltage adjustment under conditions of unity and rated load as well as at no load.

Other further objects and advantages will be understood from the following description taken in connection with the accompanying drawings illustrating a circuit diagram of a preferred embodiment of the invention in Fig. 1 and another embodiment of the invention in Fig. 2.

This circuit is of the compensated voltage regulating type which depends on the value of the circuit elements and the variation in the gain of the circuit to correct the departure of the main voltage from a particular value. When the line voltage drops below the set value the gain of the circuit increases which in turn increases the current supplied to the generator field thus raising the line voltage. When the line voltage exceeds the set value the gain decreases and the field excitation decreases lowering the voltage.

In the embodiment shown in the drawing the field current of the generator 10 is derived from the exciter 11. The generator and exciter may be driven by a suitable prime mover 13 such as an electric motor or a gasoline engine or the like through a common driving means such as the shaft 12. The stator output windings 14, 15, 16 of the generator 10 are formed in Y-connection with the free ends of the windings 14, 15, 16 connected to the output lines 17, 18, 19. The exciter 11 has a field winding 21 determining the value of the field current supplied to the generator 10 through the lines 11a. The current in the field winding 21 is controlled by the voltage regulating system and as the field winding current decreases the output voltage between the lines 17, 18, 19 decreases and as the field winding current increases, the voltage between the lines correspondingly increases.

The exciter field winding 21 is connected across the full wave rectifier 22, preferably of the dry plate type such as selenium or the like. The rectifier is connected in series with the secondary reactor 23 between the neutral or common connecting point 24 of the generator output windings 14, 15, 16 and main line 17 connected to the first phase winding 14. The secondary reactor 23 is connected to the neutral or common connecting point 24 by line 20.

The saturable reactors 26, 27 are connected in series and preferably comprise three-legged cores 28, 29 respectively. The anode winding 28a, feedback winding 28f, and the control or sensing winding 28c are wound on the center leg of the core 28 and the anode winding 29a, feedback winding 29f, and the control or sensing winding 29c are wound on the center leg of the core 29. The anode windings 28a, 29a are connected in series and the series combination of the anode windings is connected in parallel with the input of the rectifier 22. The anode windings are therefore, in series with the secondary reactor 23.

The feedback windings 28f, 29f are connected in series and wound on a respective center leg in reverse relation with respect to the respective anode windings 28a, 29a so that on a particular half cycle the direct current flux of one feedback winding is opposing the flux of the respective anode winding and the direct current flux of the other feedback winding is in the same direction as the flux of the respective anode winding. On the next half cycle the relation of the respective fluxes reverses. The alternating current continuously passes through the anode windings and the direct exciter field current passes continuously through the feedback windings.

The sensing windings 28c, 29c are connected in series across the output of the full wave bridge type rectifier 31, preferably with dry plate type rectifiers. The direct current passes through the windings 28c, 29c and produces a flux in each core opposing the flux of the respective feedback winding. Thus, when the flux of the feedback winding is in the same direction as the anode winding flux, the sensing winding flux opposes the anode winding flux and when the feedback winding flux opposes the anode winding flux, the flux of the sensing winding is in the same direction as the flux of the anode windings.

The voltage between the neutral point 24 and the line 17 is divided between the secondary reactor 23 and anode windings 28a, 29a connected in series. The apportionment of the voltage between the reactor 23 and anode windings 28a, 29a is primarily controlled by the feedback and sensing windings of the saturable reactors 26, 27 and the current transformer 32. The current transformer has its primary winding connected in the line 17 of the first phase and the secondary winding connected in shunt with the secondary reactor.

The phase relation of the current passing through the secondary reactor 23 from line 20 and the current in the secondary winding 32b varies with alterations in the power factor of the main current. It is preferable under load conditions that the currents should be 180° out of phase at zero power factor and 90° out of phase at unity power factor. The secondary reactor 23 causes the current from line 20 to lag the voltage by approximately 90°. It also causes the current from the secondary winding 32b to lag its voltage by 90°. The current transformer action gives an additional 90° lag to the secondary current under conditions of unity power factor. This makes the secondary current lag the current from line 20 by 90 degrees under unity load conditions. An additional lag is given the secondary current as the power factor of the load decreases due to an inductive load. This additional lag becomes 90° at zero power factor load conditions, giving a 180° phase shift between the two currents. With the line 20 connected to the neutral point 24 these currents may be positioned to within thirty degrees.

As the load current increases the combined impedance of the secondary reactor 23 decreases placing more of the voltage across the anode windings 28a, 29a and the rectifier 22, thereby increasing the exciter field current. The feedback windings 28f, 29f are in series with the exciter field winding 21 and the resistor 34. The feedback windings provide a positive feedback because the impedance of the anode windings decreases with increase in the current to the exciter field windings. The resistor 34 provides an adjustment of the total load resistance in the exciter field circuit. The sensing windings 28c, 29c having a negative effect on the anode windings decreasing the impedance of the anode windings when the current in the sensing circuit increases.

In considering the operation of the circuit, three types of load conditions will be discussed. These load conditions are at no load, load with unity power factor and rated load with less than unity power factor. Under no load conditions, the current through the lines 17, 18, 19 is negligible. The secondary winding of the transformer 32 has little effect on the impedance of the secondary reactor 23 and the majority of the voltage of the winding 14 is dropped across the secondary reactor. The secondary winding 32b has a high impedance shunt across the secondary reactor so that the remaining voltage of the winding 14 is dropped across the anode windings 28a and 29a of the saturable reactors and the rectifier 22 connected in parallel therewith. The main adjustment of the saturable reactors under no load conditions is made by the sensing circuit. The adjustable resistor 36 connected in series with the sensing windings 28c and 29c sets the no load voltage level of the generator. Since the current passing through the exciter field winding 21 is small, the feedback windings 28f and 29f have only a slight effect on the control of the output voltages. Thus, it is seen that under no load conditions, the output voltage of the generator is primarily controlled by the sensing circuit.

Under load conditions having a unity power factor, the output is controlled by the secondary winding 32b of the current transformer and by the sensing circuit. With current passing through line 17, the current transformer is energized and the secondary winding impresses an output current across the parallel secondary reactor 23. The output current is at approximately a 90° phase angle with the current in the secondary reactor. The magnitude of the current in the secondary winding is slightly less than that in the secondary reactor and the polarity of the two currents is such that the combined current is slightly less than the current from winding 14. This decrease in current represents a decrease in the voltage across the secondary reactor which causes the rectifier 22 in parallel with the anode 28a and 29a to assume a larger portion of the voltage of the winding 14. The output of the rectifier increases and a larger amount of current passes thru the exciter field winding 21. This increase in the field current raises the output voltage of the generator to the value under no load conditions. Thus the drop in voltage due to the placing of a load across the output lines is compensated for and the voltage is maintained substantially constant over a range from no load to full load at unity power factor.

The sensing circuit also compensates for a decrease in output voltage. Since the voltage decreases across the input of rectifier 31, the output or sensing current of the rectifier 31 passing through the sensing windings 28c, 29c also decreases. The impedance of the anode windings is increased which increases the voltage apportion across the rectifier 22. The output of the rectifier is thus increased and concommitantly increases the output voltage.

Under rated load conditions at less than unity power factor, for example, and 80% power factor, the output voltage is compensated through the current transformer 32, the sensing circuit and the feedback windings 28f and 29f. The sensings circuit provides the same type of regulation as under no load conditions or load conditions having a unity power factor. The phase difference between the current in the secondary reactor and the current in the secondary winding is between 90° and 180°. The component of the secondary winding current affecting the voltage across the reactor is 180° out of phase with the secondary reactor current and is of the same order of magnitude as the secondary reactor current. Thus, the current in the secondary reactor is substantially reduced and the portion of the voltage of line 14 across the reactor is reduced.

A greater portion of the voltage of the line 14 is then placed across the anode windings 28a, 29a and the rectifier 22. The exciter field current correspondingly increases to raise the output voltage of the field. With the high exciter field current passing through the feedback windings 28f, 29f, the positive feedback of these windings is considerably increased and the gain of the saturable reactor is also increased. Thus, the exciter field current further increases until an equilibrium is reached. The sensing circuit impresses a negative effect on the saturable reactors to prevent an over-compensation.

The sensing circuit provides a negative effect on the anode windings of the saturable reactor and is utilized to set output voltage level by the adjustment of the resistor 36. With this negative effect on the impedance of the anode windings, the voltage sensings circuit provides a partial correction from over-compensation by the current transformer 32. Also, the voltage sensings circuit compensates for any drift or shift in the output voltage of the generators caused by the variation in values of the elements. Thus, the sensings circuit in general provides for the compensation of any decrease in the output voltage by increasing the impedance of the anode windings 28a, 29a. An inductance 37 in series with the input of the rectifier 31 provides a phase shift of the current impressed on the rectifier 31 to bring it within close phase relationship with the other currents in the saturable reactor windings.

The feedback windings 28f and 29f provide a 100% positive exciter field winding current. Since the exciter field winding current is of a negligible value under no load and unity load conditions, these windings provide very little compensation under these conditions. However, under loads other than unity power factor, these windings provide increase compensations with decrease in the power factor.

This circuit can be used to regulate single phase as well as three phase generators. In the three phase embodiment herein described, the current transformer is connected in the first phase line and the current supplied to the generator exciter field windings is also derived from the first phase. The sensing circuit is connected to the second and third phase lines; thus giving the circuit a three phase sensing. To adapted the circuit to a single phase, the sensing circuit and the current supply for the exciter field winding would be connected across the output of the single phase generator and the current transformer would be connected in the lines.

In another embodiment of the invention the secondary reactor 23 may be replaced by a fixed resistor or a resistor that is variable with voltage or temperature. Since the resistor does not inherently produce a phase shift it is connected at a point on the generator windings that would supply voltage at a phase of ninety degrees to the voltage of winding 14.

A temperature sensitive resistor may be substituted for the secondary reactor 23. This type of resistor assists in the reduction of the drift of the output voltage. A change in temperature would produce a change in resistance and consequently a change in current that would be in the proper direction to maintain temperature correction of the exciter output. The resistance of the resistor will vary to adjust the apportionment of the voltage to compensate for any deviations due to temperature changes and thereby reduce the drift of the generator voltage from the set value.

Various other modifications and changes may be made without departing from the scope of the invention.

I claim:

1. A voltage regulating system for an alternating current generator comprising means for supplying exciting current to said generator affecting the output voltage, said supply means having an input, impedance means and said input series connected across the output of said generator for proportioning the voltage therebetween, transformer means passing current changing in phase and magnitude with the load and connected in parallel with said impedance means to vectorally combine said transformer current and said impedance current at a phase angle increasing with lagging current to reduce the voltage across said impedance means and to increase the exciter current.

2. A voltage regulating system as claimed in claim 1 wherein a saturable reactor having an anode winding is provided, and said supply means includes a rectifier connected across the input, said anode winding connected in parallel with said rectifier and in series with said impedance means to vary the apportionment of the generator voltage across the impedance means and said rectifier.

3. A voltage regulating system as claimed in claim 2 wherein said saturable reactors have feedback windings for passing the exciting current to vary the impedance of said anode windings in accordance with the variation in the exciting current supplied to the generator.

4. A voltage regulating system as claimed in claim 3 wherein said saturable reactors have sensing windings and a second rectifier is provided having an input coupled across the output of the generator and an input connected to said sensing windings to supply a direct current to said windings varying the impedance of said anode windings inversely to the variation in the output voltage of the generator.

5. A voltage regulating system for an alternating current generator supplied with field current from an exciter comprising an impedance and a first rectifier connected in series across the output of said generator, a pair of saturable reactors having anode windings, feedback windings and sensing windings, said anode windings connected in series across the input of said rectifier and in series with said impedance to apportion the voltage across said rectifier, sensing circuit having a second rectifier connected to the output of said generator, sensing windings connected in series across the output of said second rectifier to receive current varying according to changes in the generator output voltage, said feedback windings connected in series with said exciter across the output of said first rectifier, said sensing and said feedback windings controlling the impedance of the saturable reactors to maintain the generator output voltage at a substantially constant value.

6. A voltage regulating system for an alternating generator having the output windings connected in Y-formation to the output lines and having an exciter supplying the generator field current comprising a pair of series connected saturable reactors, each having an anode winding, a feedback winding, and a sensing winding, a reactor connected in series with said series anode windings between the neutral point of generator windings and an output line of the generator to apportion the generator voltage between the reactor and said anode windings, a first rectifier having an input connected with said anode windings and an output connected to the exciter to supply the exciter with field current for controlling the generator output voltage, a current transformer having a primary winding connected in the output line and a secondary winding connected in shunt to the reactor to vary the impedance of said reactor and the apportionment of output voltage across said reactor and said anode windings, a second rectifier having an output across the other two output lines and an input connected across said series sensing circuit for setting the generator output voltage, said series feedback windings connected in the output of first rectifier to pass the exciter field current to vary the impedance of said anode windings in accordance with the variation of the exciter field current.

7. A voltage regulating system for an alternating current generator having output windings in Y-connection and adapted to be supplied with field current from an exciter and comprising a current transformer having a primary winding in an output line and a secondary winding, a pair of series connected saturable reactors having anode windings connected in series, a reactor connected in series with said anode windings between the neutral point of said Y-connection and the load side of the primary winding, the secondary winding of said current transformer connected across said reactor to vectorally combine the transformer current with the reactor current for lowering the impedance of said reactor on a lagging power factor current thereby changing the apportionment of the generator voltage between said anode windings and said reactor.

8. A voltage regulating system as claimed in claim 7 wherein said saturable reactors having a pair of feedback windings passing current supplied to said exciter for correspondingly varying the impedance of said anode windings when the exciter current varies.

9. A voltage regulating system as claimed in claim 8 wherein said pair of saturable reactors having series connected sensing windings connected across the other output lines to supply a corrective-current to compensate for a departure from a given voltage.

10. A voltage regulating system for an alternating current generator having output windings connected in Y-connection to the output lines and having an exciter supplying generator field current comprising a current transformer having a primary winding connected in an output line and having a secondary winding, a pair of series connected saturable reactors having anode windings connected in series a phase adjusting resistor connected in series with said anode windings between the neutral point of said Y-connection and the load side of said primary winding, said secondary winding connected across said resistor to vectorally combine the transformer current and the current from said neutral point to reduce the resistance of said resistor with lagging output current and thereby varying the apportionment of the generator voltage between said anode windings and said phase adjusting resistor and a phase shifting means cooperating with said resistor and said secondary winding to adjust the phase relationship between the current passing through said resistor and said secondary winding.

11. A compensated voltage regulating system for an alternating current generator having output windings connected in Y-connection to the output lines and having an exciter supplying generator field current comprising a current transformer having a primary winding connected in an output line and a secondary winding, a pair of series connected saturable reactors having anode windings connected in series, a temperature sensitive resistor connected in series with said anode windings between the neutral point of the Y-connection and the load side of said output line containing the primary winding of said current transformer to adjust the apportionment of the voltage between said resistor and said anode windings to compensate for the drift of the system.

References Cited in the file of this patent

UNITED STATES PATENTS

| | | |
|---|---|---|
| 2,396,851 | Hysler | Mar. 19, 1946 |
| 2,547,615 | Bedford | Apr. 3, 1951 |
| 2,558,572 | Logan | June 26, 1951 |